(12) United States Patent
Takahashi et al.

(10) Patent No.: US 9,765,879 B2
(45) Date of Patent: Sep. 19, 2017

(54) SHIFT CONTROL APPARATUS (71) Applicant: MITSUBISHI JIDOSHA KOGYO KABUSHIKI KAISHA, Tokyo (JP)

(72) Inventors: Ryota Takahashi, Okazaki (JP); Jinichi Ohta, Nagoya (JP); Makoto Kamachi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/135,768

(22) Filed: Apr. 22, 2016

(65) Prior Publication Data
US 2016/0312883 A1 Oct. 27, 2016

(30) Foreign Application Priority Data

Apr. 24, 2015 (JP) .................................. 2015-089749

(51) Int. Cl.
*F16H 59/10* (2006.01)
*F16H 59/54* (2006.01)
(Continued)

(52) U.S. Cl.
CPC .......... *F16H 59/105* (2013.01); *B60L 11/182* (2013.01); *B60L 11/1809* (2013.01);
(Continued)

(58) Field of Classification Search
CPC ........ F16H 59/105; F16H 59/50; F16H 59/54; F16H 61/16; F16H 61/24;
(Continued)

(56) References Cited

U.S. PATENT DOCUMENTS 6,098,733 A * 8/2000 Ibaraki .................. B60K 6/543
180/65.28
6,424,053 B1 * 7/2002 Wakashiro ............. B60K 6/485
180/65.26
(Continued)

FOREIGN PATENT DOCUMENTS

EP   2 682 300 A1   1/2014
GB   2501728 A      11/2013
(Continued)

OTHER PUBLICATIONS

Bao et al., "Battery energy storage system load shifting control based on real time load forecast and dynamic programming," Year: 2012, pp. 815-820.*
(Continued)

*Primary Examiner* — Tuan C. To
(74) *Attorney, Agent, or Firm* — Birch Stewart Kolasch & Birch, LLP (57) ABSTRACT

A shift control apparatus includes a charging state detecting unit that detects a charging state, a shift lever that is held at a predetermined reference position, a limiting member that validates an operation of the shift lever located at the reference position when the limiting member is operated and a controller that validates a shift operation of the shift lever from the reference position to a predetermined operation position when the charging state of a vehicle is not detected and an operating amount of the limiting member is equal to or larger than a first changing condition amount and validates the operation of the shift lever from the reference position to the predetermined operation position when the charging state of the vehicle is detected and the operating amount of the limiting member is equal to or larger than a second changing condition amount.

10 Claims, 5 Drawing Sheets

(51) Int. Cl.
*F16H 59/50* (2006.01)
*B60L 11/18* (2006.01)
*F16H 61/02* (2006.01)
*F16H 61/16* (2006.01)
*F16H 61/24* (2006.01)
*F16H 61/22* (2006.01)

(52) U.S. Cl.
CPC .......... *B60L 11/1816* (2013.01); *F16H 59/50* (2013.01); *F16H 59/54* (2013.01); *F16H 61/02* (2013.01); *F16H 61/16* (2013.01); *F16H 61/24* (2013.01); *B60Y 2200/91* (2013.01); *B60Y 2200/92* (2013.01); *B60Y 2400/214* (2013.01); *F16H 2061/223* (2013.01); *F16H 2061/245* (2013.01)

(58) Field of Classification Search
CPC ......... F16H 2061/223; F16H 2061/245; F16H 61/02; F16H 61/0213; B60L 11/1809; B60L 11/1816; B60L 11/182; B60Y 2200/91; B60Y 2200/92; B60Y 2400/214
See application file for complete search history.

(56) References Cited

U.S. PATENT DOCUMENTS

| | | | | |
|---|---|---|---|---|
| 2002/0033059 A1* | 3/2002 | Pels | ................ | B60K 6/26 74/329 |
| 2006/0293144 A1* | 12/2006 | Nishina | ................ | B60K 6/48 477/5 |
| 2007/0275819 A1* | 11/2007 | Hirata | ................ | B60K 6/365 477/5 |
| 2012/0309590 A1* | 12/2012 | Kanai | ................ | F16H 61/12 477/92 |
| 2013/0090797 A1* | 4/2013 | Izumi | ................ | B60L 11/123 701/22 |
| 2013/0124023 A1* | 5/2013 | Nabeshima | ................ | B60L 3/08 701/22 |
| 2013/0166125 A1* | 6/2013 | Yamamoto | ................ | B60L 7/14 701/22 |
| 2013/0264867 A1* | 10/2013 | Mitsutani | ................ | B60L 1/003 307/10.1 |
| 2013/0332019 A1* | 12/2013 | Goto | ................ | F16H 61/22 701/22 |
| 2014/0318294 A1* | 10/2014 | Kamada | ................ | F16H 61/32 74/473.12 |
| 2015/0066257 A1 | 3/2015 | Ochocinski et al. | | |
| 2015/0116099 A1 | 4/2015 | Straugheir | | |
| 2016/0046280 A1* | 2/2016 | Lee | ................ | B60W 20/30 701/22 |

FOREIGN PATENT DOCUMENTS

| | | | | |
|---|---|---|---|---|
| JP | WO 2010079606 A1 * | 7/2010 | ................ | B60L 3/12 |
| JP | 2012-205313 A | 10/2012 | | |
| JP | 2012-205314 A | 10/2012 | | |
| JP | 5580132 B2 | 8/2014 | | |
| KR | 101126244 B1 * | 3/2012 | | |

OTHER PUBLICATIONS

Extended European Search Report issued Oct. 18, 2016 in corresponding EP Application No. 16166169.9.

* cited by examiner

SHIFT CONTROL APPARATUS

CROSS REFERENCE TO RELATED APPLICATION

This application is based on Japanese Patent Application No. 2015-089749 filed on Apr. 24, 2015, the contents of which are incorporated herein by reference.

BACKGROUND

1. Technical Field

The present invention relates to a shift control apparatus of a vehicle which is charged with external power.

2. Related Art

In recent years, with interests in environmental issues, various electric vehicles have been spread and various vehicles which are charged with external power are known. As the vehicles which are charged with external power, for example, a vehicle that acquires a traveling driving force from a driving force of an electric motor and a vehicle that acquires a traveling driving force by combining a driving force of an engine and a driving force of an electric motor are known.

In a vehicle which is charged with external power, for example, a power supply plug extending from external power supply equipment (charging equipment) or an external power supply is inserted into a charging port and the vehicle is supplied and charged with power. When the vehicle travels in a state in which the power supply plug is inserted into the charging port, there is a possibility that the power supply plug or the charging port will be destroyed. As a technique of preventing destruction of the power supply plug or the charging port, a technique of invalidating an operation of a shift lever in a state in which the power supply plug is inserted into the charging port is known in the related art (for example, see Japanese Patent No. 5580132).

In the technique disclosed in Japanese Patent No. 5580132, even when a shift lever is shifted from a P position to a D position or a R position in a state in which a power supply plug is inserted into a charging port during supply of power, the shift operation is invalidated and thus the vehicle cannot be made to move in a state in which the power supply plug is inserted into the charging port. Accordingly, the vehicle does not unintentionally travel.

However, even in a state in which the power supply plug is inserted into the charging port during supply of power (even under charging), it may be necessary to take in and out a piece of baggage or for an occupant to go in and out a vehicle interior. Depending on a position of the vehicle under charging, taking in and out of a piece of baggage or going in and out of an occupant may be impossible. In this case, by moving the vehicle within an allowable length range of a power supply cord, taking in and out of a piece of baggage or going in and out of an occupant becomes possible. Even when the power supply plug is not actually inserted into the charging port, it may be determined that the vehicle is under charging and an operation of the shift lever may be invalidated due to erroneous determination of a charging state. In this case, when the operation of the shift lever can be validated and the shift lever can be shifted to a neutral state by a shift operation of the shift lever, movement by a wrecker or the like can be facilitated.

In the technique disclosed in Japanese Patent No. 5580132, since the shift operation of the shift lever is invalidated in a state in which the power supply plug is inserted into the charging port, the vehicle cannot move under charging. Accordingly, the vehicle under charging could not move slightly and the taking in and out of a piece of baggage or the going in and out of an occupant was not possible. When the charging state is erroneously determined, the shift operation of the shift lever is invalidated and it is thus difficult to move the vehicle.

The present invention is made in consideration of the above-mentioned circumstances and an object thereof is to provide a shift control apparatus that can validate a shift operation of a shift lever when a charging state is detected but a predetermined condition is satisfied.

SUMMARY OF THE INVENTION

According to an aspect of the invention, when the charging state of the vehicle is detected by the charging state detecting unit and the operating amount of the limiting member is equal to or larger than the second changing condition amount which is an operating amount larger than the first changing operating amount, the shift operation of the shift lever from the reference position to the predetermined operation position is validated. Accordingly, when the charging state is detected but the operating amount of the limiting member increases, the shift operation of the shift lever from the reference position to the predetermined position is validated. As a result, it is possible to validate the shift operation of the shift lever when a charging state is detected but a predetermined limiting condition is satisfied. The shift lever which is held at the predetermined reference position employs, for example, a shift lever which is biased to the predetermined reference position.

DESCRIPTION OF PREFERRED EMBODIMENT

A shift control apparatus according to the present invention is a shift control apparatus of a vehicle which is supplied and charged with power from the outside and validates a shift operation of a shift lever from a reference position to a predetermined operation position when a predetermined condition is satisfied under a predetermined limitation by a limiting member even under charging or in a state in which charging can be carried out (when a charging state is detected). For example, a shift operation from a P position which is a position of a parking state to an N position which is a neutral position is validated.

As the predetermined condition, any one of an operating amount of a brake pedal, a duration of a shift operation of the shift lever, and an operating amount of the shift operation of the shift lever or a combination thereof, which are carried out to enable the shift operation of the shift lever, can be used. The shift operation of the shift lever is validated, for example, when a brake pedal is stepped more than normal. For example, the shift operation of the shift lever may be validated when the shift lever is operated for a period of time longer than normal or by an operating amount larger than normal.

By validating the shift operation of the shift lever under a predetermined limitation by a limiting member, a vehicle can move even under charging or in a state in which charging can be carried out. Accordingly, a vehicle under charging or in a state in which charging can be carried out can be moved slightly to enable taking in and out of a piece of baggage or an occupant's going in and out, thereby improving usability.

Figure 1:
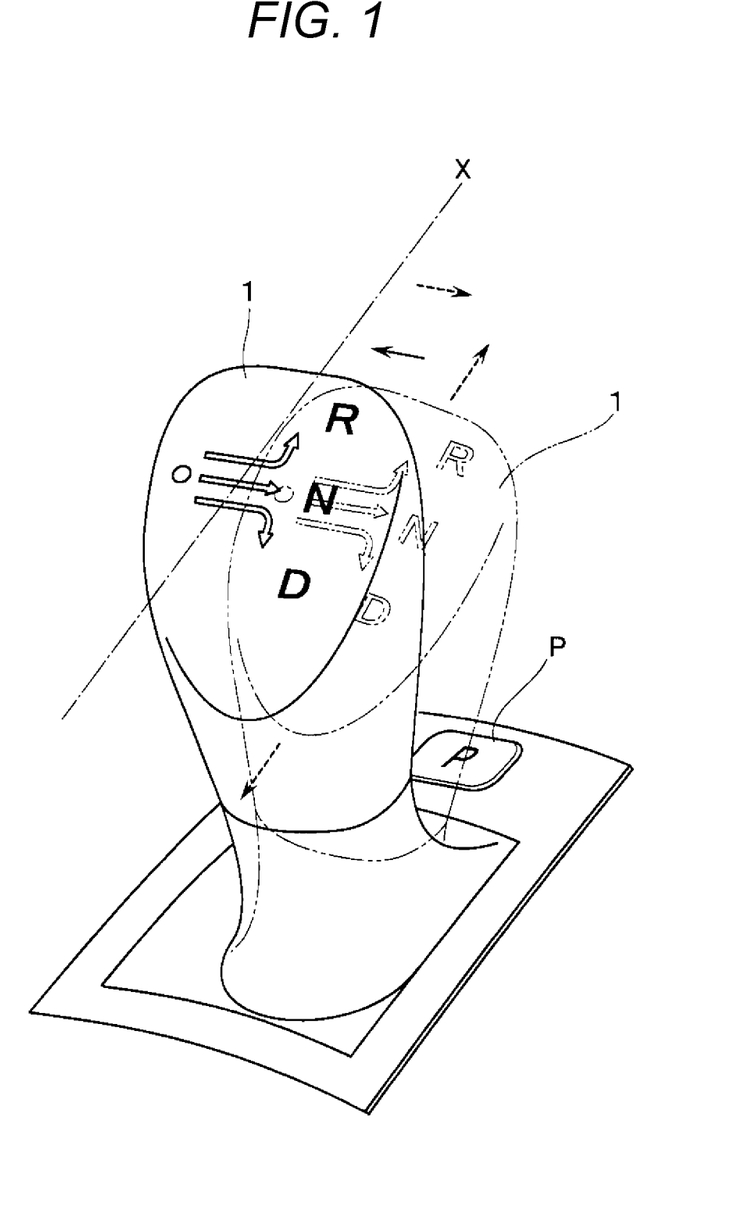
FIG. 1 is a diagram illustrating an appearance of a shift lever according to the present invention.

A shift lever which is applied to the shift control apparatus according to the present invention will be described below with reference to FIG. 1. FIG. 1 illustrates an appearance of the shift lever which is applied to the shift control apparatus according to the present invention.

The shift lever 1 in a state illustrated by broken lines in the drawing is operated in the direction indicated by a dotted arrow in FIG. 1, the shift lever 1 is shifted from a reference position X (a solid line in FIG. 1) to a neutral position (N position), a drive position (D position), or a reverse position (R position), the shift operation is validated when the operation time reaches a predetermined duration, and the shift position is switched by an actuator. By detaching a hand from the shift lever 1 after the shift operation is validated, the shift lever 1 moves back in the direction indicated by a solid arrow in FIG. 1 and is returned to the reference position X. By pushing a parking button P when the shift lever 1 is positioned at the reference position X, the reference position X is set to the position of a parking state (P position).

As the drive mechanism of the shift lever, a mechanism of shifting the shift lever to the P position, the R position, the N position, and the D position and holding the shift lever at that position may be employed.

A vehicle having the shift lever 1 illustrated in FIG. 1 includes a shift control apparatus according to an embodiment of the present invention. The vehicle having the shift control apparatus according to an embodiment of the present invention is a vehicle which is supplied and charged with external power and includes a power supply port which is connected to a power supply plug. When the power supply plug is connected to the power supply port, a charging state of the vehicle is detected (charging state detecting unit).

The charging state detecting unit may detect the charging state of the vehicle when the power supply plug is connected and the supply of power is actually started. In case of a noncontact charger, when the vehicle moves to a predetermined chargeable range or the charging is actually started, the charging state detecting unit may detect the charging state of the vehicle.

In a shift control apparatus according to a first embodiment of the present invention, when the charging state is detected and a predetermined condition is satisfied, a shift operation of the shift lever 1 of shifting the shift lever 1 from a reference position X (P position) to the N position as a predetermined operation position is validated. As the predetermined condition, an operating amount of a brake pedal (an operating amount of the limiting member) which is performed to enable the shift operation of the shift lever is applied.

Figure 2:
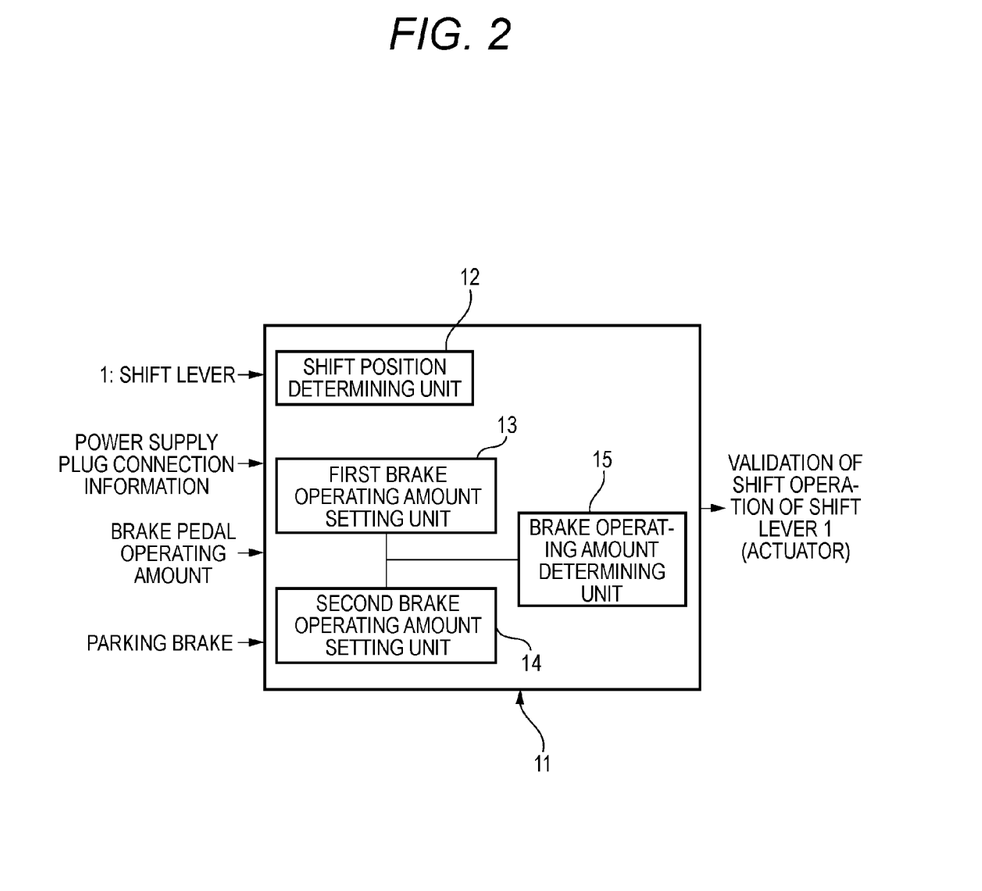
FIG. 2 is a block diagram illustrating a configuration of a shift control apparatus according to a first embodiment of the present invention.
Figure 3:
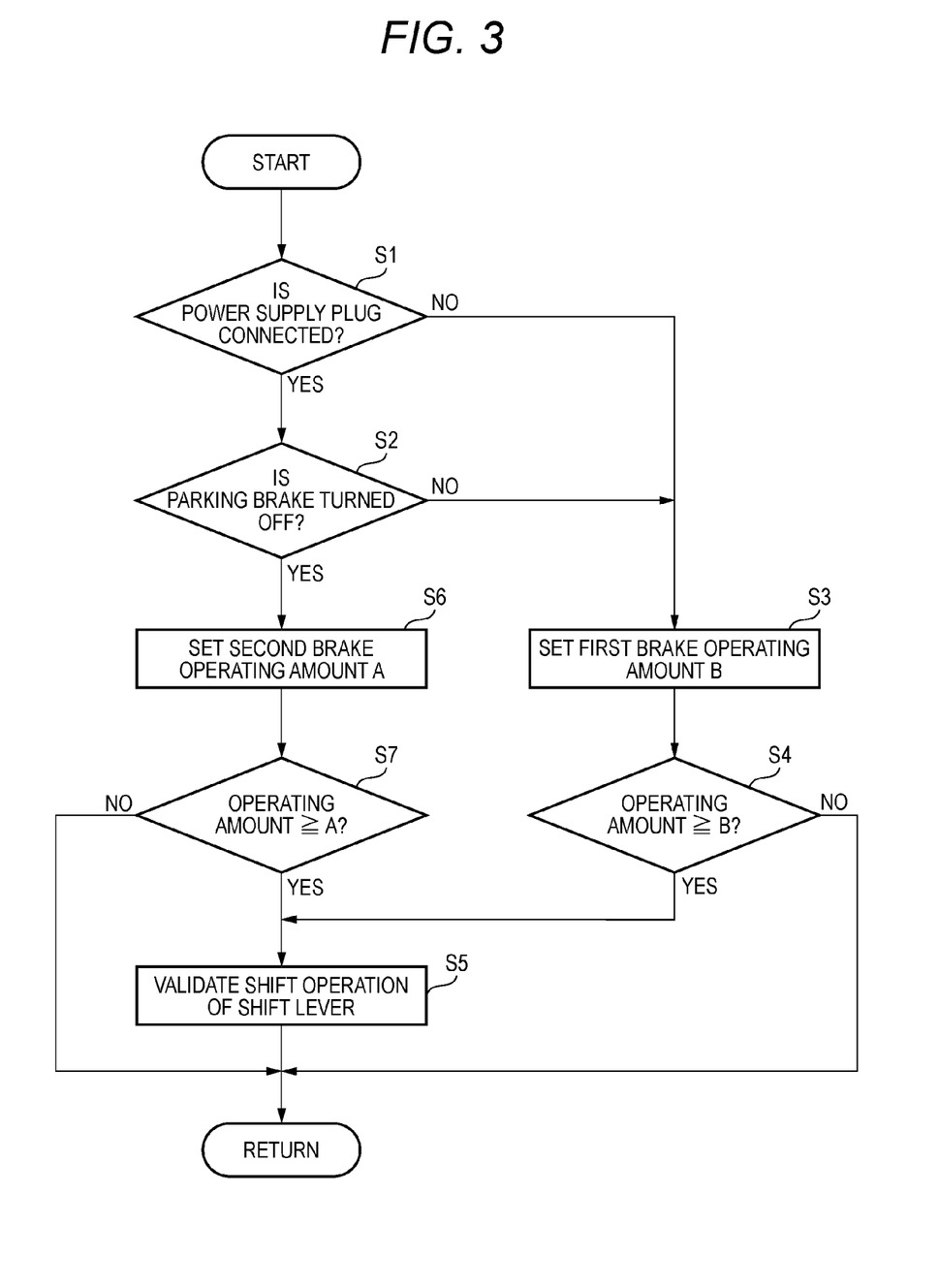
FIG. 3 is a flowchart illustrating an operation flow of the shift control apparatus according to the first embodiment of the present invention.

The shift control apparatus according to the first embodiment of the present invention will be specifically described below with reference to FIGS. 2 and 3. FIG. 2 illustrates a block configuration of the shift control apparatus according to the first embodiment of the present invention and FIG. 3 illustrates a flowchart of an operation flow of the shift control apparatus according to the first embodiment of the present invention.

The block configuration of the shift control apparatus will be specifically described with reference to FIG. 2.

As illustrated in the drawing, the shift control apparatus includes a controller 11 in which an operating amount of the brake pedal required for validating the shift operation of the shift lever 1 from the P position to the N position is set. The controller 11 includes a shift position determining unit 12 that determines the shift position of the shift lever 1.

The controller 11 includes a first brake operating amount setting unit 13. The first brake operating amount setting unit 13 sets a first brake operating amount which is referred to when the charging state detecting unit detects that the power supply plug is not connected. That is, the operating amount of the brake pedal for validating the shift operation of the shift lever 1 from the P position to the N position is set as the first brake operating amount (first changing condition amount).

The controller 11 includes a second brake operating amount setting unit 14. The second brake operating amount setting unit 14 sets a second brake operating amount which is referred to when the charging state detecting unit detects that the power supply plug is connected. As the operating amount of the brake pedal for validating the shift operation of the shift lever 1 from the P position to the N position, the second brake operating amount (second changing condition amount) is set to be larger than the first brake operating amount.

The controller 11 includes a brake operating amount determining unit 15 that selects and determines a brake operating amount for validating the shift operation of the shift lever 1 based on input information. That is, the brake operating amount determining unit 15 selects one of the first brake operating amount set by the first brake operating amount setting unit 13 and the second brake operating amount set by the second brake operating amount setting unit 14 based on input information. The brake operating amount determining unit 15 determines whether an actual brake operating amount reaches the selected operating amount.

Operation information of the shift lever 1, connection information of the power supply plug, operating amount information of the brake pedal (brake operating amount information), and operation information of a parking brake as the traveling limiting unit are input to the controller 11. The controller 11 outputs an operation command to an actuator that performs the shift operation to validate the shift operation of the shift lever 1.

The control operation will be specifically described below with reference to FIG. 3.

As illustrated in the drawing, it is determined in step S1 whether the power supply plug is connected. When it is determined in step S1 that the power supply plug is connected, it is determined in step S2 whether the parking brake is turned off (deactivated). When it is determined in step S1 that the power supply plug is not connected, that is, when the charging state is not detected, the first brake operating amount B is set in step S3 (first brake operating amount setting unit 13).

When it is determined in step S2 that the parking brake is not turned off, that is, when it is determined that the parking brake is turned on and the parking brake is activated, the first brake operating amount B is set in step S3 (second brake operating amount setting unit 14) without depending on whether the power supply plug is connected.

After the first brake operating amount B is set in step S3, it is determined in step S4 whether the operating amount of the brake pedal is equal to or larger than the first brake operating amount B. When it is determined in step S4 that the operating amount of the brake pedal is equal to or larger than the first brake operating amount B, the shift operation of the shift lever 1 is validated in step S5.

When the power supply plug is not connected and the operating amount of the brake pedal is equal to or larger than the first brake operating amount B, the shift operation of the shift lever 1 can be validated. When the power supply plug is connected but the parking brake is activated and the operating amount of the brake pedal is equal to or larger than the first brake operating amount B, the shift operation of the shift lever 1 can be validated.

On the other hand, when it is determined in step S2 that the parking brake is turned off, the parking brake is deactivated in a state in which the power supply plug is connected. Accordingly, in step S6, a second brake operating amount A which is larger than the first brake operating amount B is set.

After the second brake operating amount A is set in step S6, it is determined in step S7 whether the operating amount of the brake pedal is equal to or larger than the second brake operating amount A. When it is determined in step S7 that the operating amount of the brake pedal is equal to or larger than the second brake operating amount A, the shift operation of the shift lever 1 is validated in step S5.

That is, when the power supply plug is connected in a state in which the parking brake is deactivated and a predetermined condition that the operating amount of the brake pedal is equal to or larger than the second brake operating amount A which is larger than the first brake operating amount B is satisfied, the shift operation of the shift lever 1 can be validated.

When the power supply plug is connected and the operating amount of the brake pedal reaches the second brake operating amount A which is larger than the first brake operating amount B, the shift operation of the shift lever 1 from the P position to the N position is validated. That is, when the power supply plug is connected but the operating amount of the brake pedal increases, the shift operation of the shift lever 1 is validated. The second brake operating amount A may be set to a level at which it is detected that the brake pedal is stepped on more than normal.

When the power supply plug is connected but the operating amount of the brake pedal increases, it is possible to determine that the predetermined condition is satisfied and to validate the shift operation of the shift lever 1, thereby moving the vehicle. Accordingly, it is possible to move slightly even a vehicle under charging and to enable taking in and out of a piece of baggage and an occupant's going in and out, thereby improving usability.

When the shift operation of the shift lever 1 is validated based on the second brake operating amount A, the operating condition of the parking brake that limits traveling of the vehicle is referred to. Accordingly, it is possible to change the condition for validating the shift operation of the shift lever 1 in correlation with the operation of the parking brake. Accordingly, the operation of validating the shift operation of the shift lever can be intentionally performed in correlation with the operation of the traveling limiting unit.

The traveling limiting unit that limits traveling of the vehicle refers to the operating condition of the parking brake, but the process (step S2) of determining whether the parking brake is turned off may be skipped.

As the traveling limiting unit, any one of a sensor that detects an open/closed state of a door, a sensor that detects a wearing state of a seat belt, a sensor that detects an inclination of a sideview mirror, and a sitting sensor that detects sitting of an occupant or a combination thereof can be used. For example, when the open state of the door, the non-wearing state of the seat belt, the inclined state of the sideview mirror, or the state in which the sitting of the occupant is not detected is detected, it may be determined whether to validate the shift operation of the shift lever 1 by comparing the brake operating amount with the second brake operating amount A. As above, a condition in which normal traveling is not performed can be used as a condition for determining whether to validate the shift operation of the shift lever 1.

The above-mentioned shift control apparatus can validate the shift operation of the shift lever 1, when the power supply plug is connected but the operating amount of the brake pedal is larger than the second brake operating amount A, that is, when the predetermined condition is satisfied.

Figure 4:
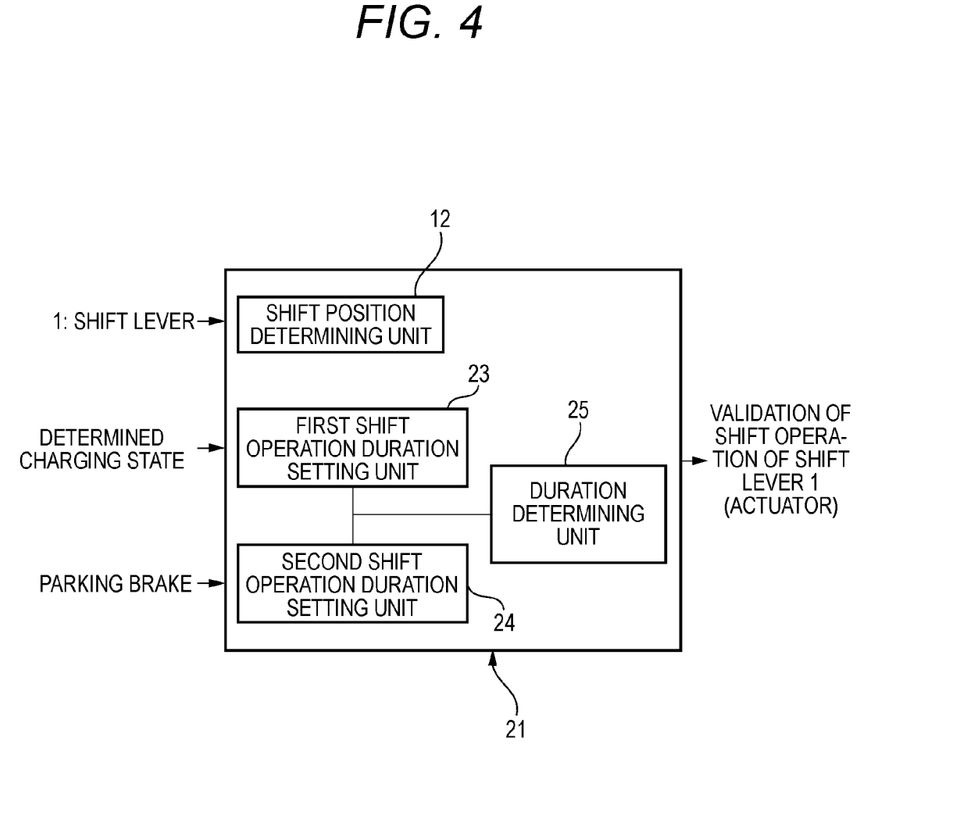
FIG. 4 is a block diagram illustrating a configuration of a shift control apparatus according to a second embodiment of the present invention.
Figure 5:
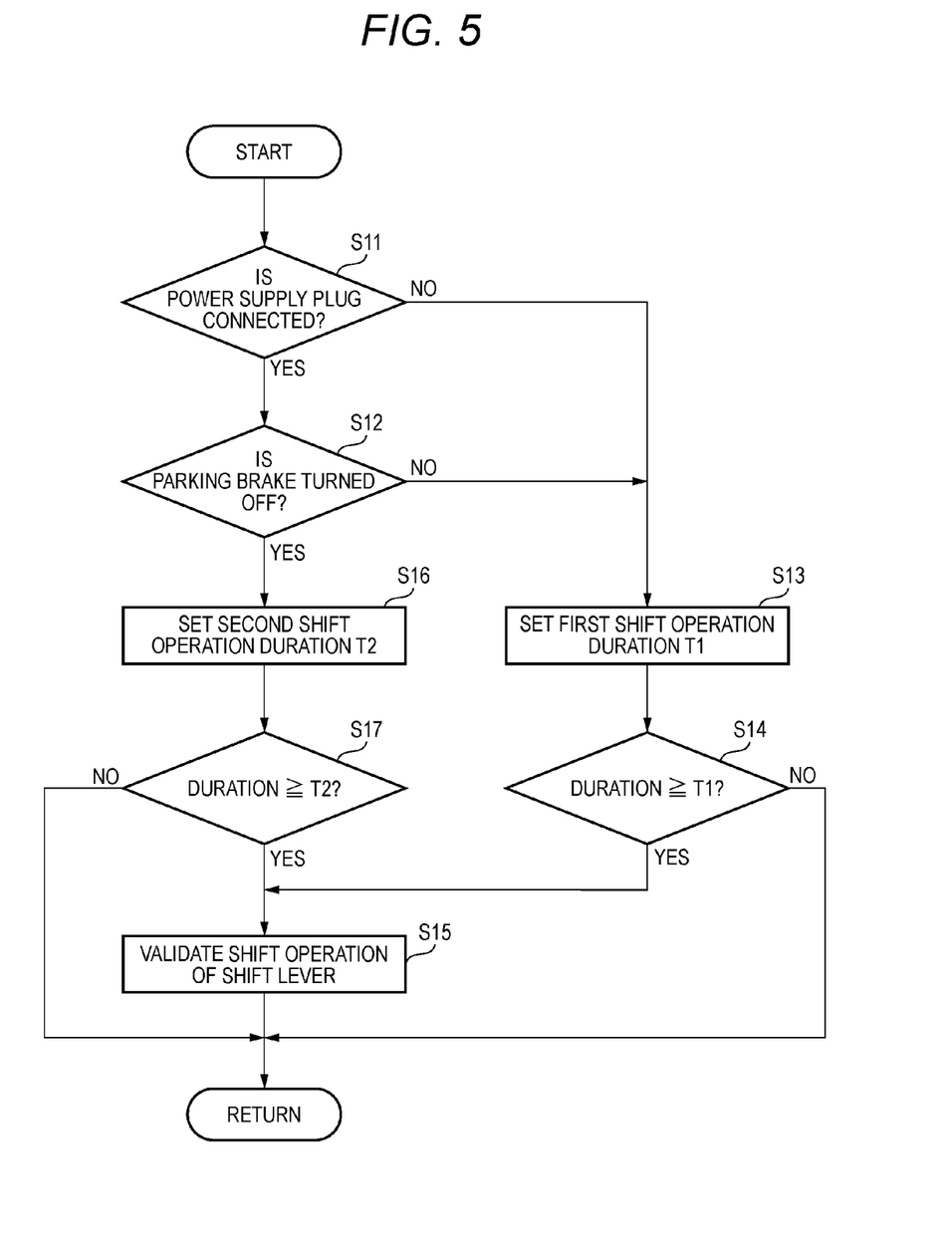
FIG. 5 is a flowchart illustrating an operation flow of the shift control apparatus according to the second embodiment of the present invention.

A shift control apparatus according to a second embodiment of the present invention will be specifically described below with reference to FIGS. 4 and 5. FIG. 4 illustrates a block configuration of the shift control apparatus according to the second embodiment of the present invention and FIG. 5 illustrates a flowchart of an operation flow of the shift control apparatus according to the second embodiment of the present invention. The same elements as those in the first embodiment illustrated in FIG. 3 are referenced by the same reference signs.

Similarly to the first embodiment, the shift control apparatus according to the second embodiment of the present invention validates the shift operation of the shift lever 1 of shifting the shift lever 1 from the reference position X (P position) to the N position which is a predetermined operation position when the charging state is detected and the predetermined condition is satisfied. A shift operation duration of the shift lever 1 (the operating amount of the limiting member) is used as the predetermined condition.

The block configuration of the shift control apparatus will be specifically described with reference to FIG. 4.

As illustrated in the drawing, the shift control apparatus includes a controller 21 in which a shift operation duration of the shift lever 1 required for validating the shift operation of the shift lever 1 from the P position to the N position is set. The controller 21 includes a shift position determining unit 12 that determines the shift position of the shift lever 1.

The controller 21 includes a first shift operation duration setting unit 23. The first shift operation duration setting unit 23 sets a first shift operation duration of the shift lever 1 which is referred to when the charging state detecting unit detects that the power supply plug is not connected. That is, the shift operation duration of the shift lever 1 to one side of the N position for validating the shift operation of the shift lever 1 from the P position to the N position is set as the first shift operation duration (first changing condition amount).

The controller 21 includes a second shift operation duration setting unit 24. The second shift operation duration setting unit 24 sets a second shift operation duration of the shift lever 1 which is referred to when the charging state detecting unit detects that the power supply plug is not connected. As the shift operation duration of the shift lever 1 to one side of the N position for validating the shift operation of the shift lever 1 from the P position to the N position, the second shift operation duration (second changing condition amount) is set to be longer than the first shift operation duration.

The controller 21 includes a duration determining unit 25 that selects and determines the shift operation duration for validating the shift operation of the shift lever 1 based on input information. That is, the duration determining unit 25 selects one of the first shift operation duration set by the first shift operation duration setting unit 23 and the second shift operation duration set by the second shift operation duration setting unit 24 based on input information. The duration determining unit 25 determines whether an actual shift operation duration of the shift lever 1 reaches the selected duration.

Operation information of the shift lever 1, connection information of the power supply plug, and operation information of a parking brake as the traveling limiting unit are input to the controller 21. The controller 21 outputs an operation command to an actuator that performs the shift operation to validate the shift operation of the shift lever 1.

The control operation will be specifically described below with reference to FIG. 5.

As illustrated in the drawing, it is determined in step S11 whether the power supply plug is connected. When it is determined in step S11 that the power supply plug is connected, it is determined in step S12 whether the parking brake is turned off (deactivated). When it is determined in step S11 that the power supply plug is not connected, that is, when the charging state is not detected, the first shift operation duration T1 is set in step S13 (first shift operation duration setting unit 23).

When it is determined in step S12 that the parking brake is not turned off, that is, when it is determined that the parking brake is turned on and the parking brake is activated, the first shift operation duration T1 is set in step S13 without depending on whether the power supply plug is connected.

After the first shift operation duration T1 is set in step S13, it is determined in step S14 whether the shift operation duration T of the shift lever 1 is equal to or longer than the first shift operation duration T1. When it is determined in step S14 that the shift operation duration T of the shift lever 1 is equal to or longer than the first shift operation duration T1, the shift operation of the shift lever 1 is validated in step S15.

When the power supply plug is not connected and the shift operation duration of the shift lever 1 is equal to or longer than the first shift operation duration T1, the shift operation of the shift lever 1 can be validated. When the power supply plug is connected but the parking brake is activated and the shift operation duration of the shift lever 1 is equal to or longer than the first shift operation duration T1, the shift operation of the shift lever 1 can be validated.

On the other hand, when it is determined in step S12 that the parking brake is turned off, the parking brake is deactivated in a state in which the power supply plug is connected. Accordingly, in step S16, a second shift operation duration T2 which is longer than the first shift operation duration is set.

After the second shift operation duration T2 is set in step S16, it is determined in step S17 whether the shift operation duration T of the shift lever 1 is equal to or longer than the second shift operation duration T2. When it is determined in step S17 that the shift operation duration T of the shift lever 1 is equal to or longer than the second shift operation duration T2, the shift operation of the shift lever 1 is validated in step S15.

That is, when the power supply plug is connected in a state in which the parking brake is deactivated and a predetermined condition that the shift operation duration of the shift lever 1 is equal to or longer than the second shift operation duration T2 which is longer than the first shift operation duration T1 is satisfied, the shift operation of the shift lever 1 can be validated.

When the power supply plug is connected and the shift operation duration T of the shift lever 1 reaches the second shift operation duration T2 which is longer than the first shift operation duration T1, the shift operation of the shift lever 1 from the P position to the N position is validated. When the power supply plug is connected but the shift operation of the shift lever 1 continues to be performed long, the shift operation of the shift lever 1 is validated. The second shift operation duration T2 may be set to a time in which it is detected that the shift lever 1 is held at the N position longer than normal.

When the power supply plug is connected but the shift operation of the shift lever 1 continues to be performed long, it is possible to determine that the predetermined condition is satisfied and to validate the shift operation of the shift lever 1, thereby moving the vehicle. Accordingly, it is possible to move slightly even a vehicle under charging and to enable taking in and out of a piece of baggage and an occupant's going in and out, thereby improving usability.

When the shift operation of the shift lever 1 is validated based on the second shift operation duration T2, the operating condition of the parking brake that limits traveling of the vehicle is referred to. Accordingly, it is possible to change the condition for validating the shift operation of the shift lever 1 in correlation with the operation of the parking brake.

In the second embodiment, the shift operation duration of the shift lever 1 is used as the operating amount of the limiting member, but the first shift operation duration and the second shift operation duration may be replaced with a first shift operating amount and a second shift operating amount. That is, when the power supply plug is not connected, it may be possible to determine that the shift lever 1 is shifted from the P position to the N position based on the first shift operating amount and to validate the shift operation. When the power supply plug is connected, it may be possible to determine that the shift lever 1 is shifted from the P position to the N position based on the second shift operating amount which is larger than the first shift operating amount and to validate the shift operation. For example, the shift operating amount can be easily determined by detecting a value of a voltage of a positional sensor which detects a position of the shift lever 1.

The traveling limiting unit that limits traveling of the vehicle refers to the operating condition of the parking brake, but the process (step S12) of determining whether the parking brake is turned off may be skipped similarly to the first embodiment.

Similarly to the first embodiment, as the traveling limiting unit, any one of a sensor that detects an open/closed state of a door, a sensor that detects a wearing state of a seat belt, a sensor that detects an inclination of a sideview mirror, and a sitting sensor that detects sitting of an occupant or a combination thereof can be used. For example, when the open state of the door, the non-wearing state of the seat belt, the inclined state of the sideview mirror, or the state in which the sitting of the occupant is not detected is detected, it may be determined whether to validate the shift operation of the shift lever 1 by comparing the shift operation duration of the shift lever 1 with the second shift operation duration T2.

The above-mentioned shift control apparatus can validate the shift operation of the shift lever 1, when the power supply plug is connected but the shift operation duration of the shift lever 1 is longer than the second shift operation duration T2, that is, when the predetermined condition is satisfied.

The present invention can be used in the industrial field of a shift control apparatus of a vehicle which is charged with external power.

What is claimed is:

1. A shift control apparatus of a vehicle which is supplied and charged with external power, the shift control apparatus comprising:
    a charging state detecting unit that detects a charging state of the vehicle;
    a shift lever that is held at a predetermined reference position;
    a limiting member that validates an operation of the shift lever located at the reference position when the limiting member is operated; and
    a controller that validates a shift operation of the shift lever from the reference position to a predetermined operation position when the charging state of the vehicle is not detected by the charging state detecting unit and an operating amount of the limiting member is equal to or larger than a first changing condition amount and validates the shift operation of the shift lever from the reference position to the predetermined operation position when the charging state of the vehicle is detected by the charging state detecting unit and the operating amount of the limiting member is equal to or larger than a second changing condition amount which is an operating amount larger than the first changing condition amount.

2. The shift control apparatus according to claim 1, wherein the limiting member is a brake pedal and the operating amount of the limiting member is an operating amount of the brake pedal,
    the shift operation of the shift lever from the reference position to the predetermined operation position is validated when the charging state of the vehicle is not detected by the charging state detecting unit and the operating amount of the brake pedal is larger than a first brake operating amount corresponding to the first changing condition amount, and
    the shift operation of the shift lever from the reference position to the predetermined operation position when the charging state of the vehicle is detected by the charging state detecting unit and the operating amount of the brake pedal is larger than a second brake operating amount corresponding to the second changing condition amount which is larger than the first brake operating amount.

3. The shift control apparatus according to claim 1, wherein the limiting member is a shift lever and the operating amount of the limiting member is a shift operation duration of the shift lever,
    the shift operation of the shift lever to the predetermined operation position is validated when the charging state of the vehicle is not detected by the charging state detecting unit and the shift operation duration of the shift lever is greater than a first shift operation duration corresponding to the first changing condition amount, and
    the shift operation of the shift lever to the predetermined operation position is validated when the charging state of the vehicle is detected by the charging state detecting unit and the shift operation duration of the shift lever is greater than a second shift operation duration corresponding to the second changing condition amount which is greater than the first shift operation duration.

4. The shift control apparatus according to claim 1, wherein the limiting member is a shift lever and the operating amount of the limiting member is a shift operating amount of the shift lever,
    the shift operation of the shift lever to the predetermined operation position is validated when the charging state of the vehicle is not detected by the charging state detecting unit and the shift operation duration of the shift lever is greater than a first shift operating amount corresponding to the first changing condition amount, and
    the shift operation of the shift lever to the predetermined operation position is validated when the charging state of the vehicle is detected by the charging state detecting unit and the shift operation duration of the shift lever is greater than a second shift operating amount corresponding to the second changing condition amount which is an operating amount larger than the first shift operating amount.

5. The shift control apparatus according to claim 1, wherein an operating condition of a traveling limiting unit that limits traveling of the vehicle is used to validate the shift operation of the shift lever from the reference position to the predetermined operation position based on the second changing condition amount.

6. The shift control apparatus according to claim 5, wherein the traveling limiting unit is a parking brake, and
    the shift operation of the shift lever from the reference position to the predetermined operation position is validated based on the second changing condition amount when the parking brake is deactivated.

7. The shift control apparatus according to claim 5, wherein the traveling limiting unit is a sensor that detects an open/closed state of a door, and
    the shift operation of the shift lever from the reference position to the predetermined operation position is validated based on the second changing condition amount when the open state of the door is detected by the sensor.

8. The shift control apparatus according to claim 5, wherein the traveling limiting unit is a sensor that detects a wearing state of a seat belt, and
    the shift operation of the shift lever from the reference position to the predetermined operation position is validated based on the second changing condition amount when the wearing state of the seat belt is not detected by the sensor.

9. The shift control apparatus according to claim 5, wherein the traveling limiting unit is a sensor that detects a received state of a sideview mirror, and
    the shift operation of the shift lever from the reference position to the predetermined operation position is validated based on the second changing condition amount when the received state of the sideview mirror is detected by the sensor.

10. The shift control apparatus according to claim 5, wherein the traveling limiting unit is a sensor that detects a sitting state of an occupant, and
    the shift operation of the shift lever from the reference position to the predetermined operation position is validated based on the second changing condition amount when the sitting state of the occupant is not detected by the sensor.

* * * * *